United States Patent
Harris

(10) Patent No.: US 8,422,999 B1
(45) Date of Patent: Apr. 16, 2013

(54) PORTABLE CAMERA ENABLED DEVICE APPLICATIONS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1653 days.

(21) Appl. No.: 11/834,324

(22) Filed: Aug. 6, 2007

(51) Int. Cl.
*H04M 3/42* (2006.01)

(52) U.S. Cl.
USPC .......... 455/414.1; 455/414.2; 455/414.3; 455/414.4; 455/566; 382/321; 382/229; 382/312; 704/277; 704/2; 704/3; 704/8

(58) Field of Classification Search .......... 382/229, 382/312, 321–324; 455/414.1–414.4, 566; 704/1–5, 7–9, 277
See application file for complete search history.

(56) References Cited

U.S. PATENT DOCUMENTS

| | | | | |
|---|---|---|---|---|
| 5,212,741 A * | 5/1993 | Barski et al. | ................. | 382/156 |
| 2002/0076111 A1* | 6/2002 | Dance et al. | ................. | 382/229 |
| 2004/0080789 A1* | 4/2004 | Anderson | ................. | 358/2.1 |
| 2005/0092894 A1* | 5/2005 | Fossum | ................. | 250/208.1 |
| 2006/0274386 A1* | 12/2006 | Wakazono et al. | ......... | 358/518 |
| 2007/0080975 A1* | 4/2007 | Yamashita et al. | ........... | 345/591 |
| 2008/0310714 A1* | 12/2008 | Stern et al. | ................. | 382/169 |
| 2008/0317346 A1* | 12/2008 | Taub | ................. | 382/182 |
| 2010/0212478 A1* | 8/2010 | Taub et al. | ................. | 84/645 |
| 2010/0213313 A1* | 8/2010 | Reed et al. | ................. | 244/118.1 |

* cited by examiner

*Primary Examiner* — Wayne Cai

(74) *Attorney, Agent, or Firm* — Law Office of Scott C. Harris, Inc.

(57) ABSTRACT

Cellular telephone camera used to obtain an image, and to produce an output that helps recognize the words within that image, for example, a menu or a bill in a restaurant. The cellular telephone can have a low-light camera device so that it can obtain images in low light. The image processing can recognize characters in the image and display those characters using the phone's own internal font(s).

18 Claims, 2 Drawing Sheets

PORTABLE CAMERA ENABLED DEVICE APPLICATIONS

BACKGROUND

Many people have trouble reading in certain surroundings such as low-light conditions. For example, people over 40 often have trouble reading menus in restaurants and bills that they get in the restaurants, especially when poorly lit. Other elderly people have trouble hearing, and many have hearing aids. However, sometimes people only have trouble hearing in special situations such as loud rooms or echoey places or in conditions where many different conversations are in progress.

It is possible to carry reading glasses, flashlights or hearing aids. However, many people forget these assistances, or simply do not bother.

SUMMARY

The present application describes using a portable communicator to assist with perception of various types.

BRIEF DESCRIPTION OF THE DRAWINGS

These and other aspects will now be described in detail in conjunction with the accompanying drawings, in which.

DETAILED DESCRIPTION

The present application recognizes that portable communicators, such as cell phones, have become ubiquitous. Most people carry their cell phone wherever they go. Many, if not all, cellphones, have cameras therein. All cellphones have microphones, which pick up the user's voice.

A second recognition is the power of the electronic devices. Technology is available for taking pictures in very low light without a flash. This technology has been used to avoid the effects from a flash, and to avoid the effects which can be caused by taking pictures using a slow shutter speed. For example, so-called panchromatic pixels add a clear photoreceptor to the red/green/blue photoreceptors, to increase the amount of light that is captured. Another technology uses nanotechnology to make nanophotodiodes which have much higher light collection capabilities, e.g. the Single carrier Modulation Photo Detector.

A low-light camera may be rated as taking a usable picture at a lower light value, e.g., 1 lux, 0.1 lux, 0.05 lux, or 0.01 lux, or even less. These devices are highly sensitive and have high dynamic ranges.

While such low light cameras are known, there has never been any expressed need for such a camera to be included in a portable communicator device such as a cellphone, PDA or blackberry.

Figure 1:
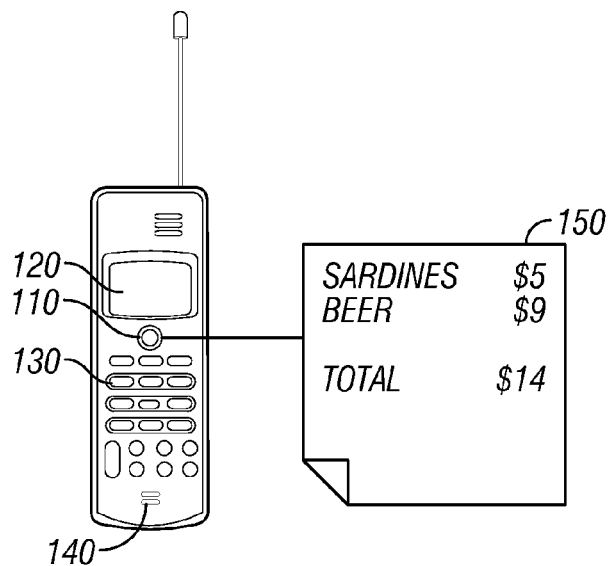
FIG. 1 illustrates an embodiment with a communication device viewing a document.

A first embodiment illustrated in FIG. 1 recognizes a previously-unrecognized and unexpected use of a camera, and especially a low-light camera, in such a portable device. Unexpectedly, the use of such a low light camera allows using that camera to assist in reading items in otherwise difficult to read conditions, such as low light conditions. No one has ever recognized any advantages of using low light cameras in a cellphone, and no one has suggested using such cameras and/or chips in a cell phone—since there was not any reason to do so.

A communicator device, e.g., a cellular telephone or PDA or Blackberry™ 100 includes a camera portion therein 110, preferably a low light camera which produces a usable picture at illuminations less than or equal to 1 lux, or less than or equal to 0.1 lux, 0.05 lux, or 0.01 lux, or even less. The image from the camera can typically be sent over the communication channel, e.g., to a server, or to another user. The cellular telephone also includes a display portion 120 and a plurality of user controls 130. In this embodiment, one of the user controls 130 is used to assist in determining the contents of a paper such as a menu or restaurant check, in low light conditions, e.g. a read assist control. The read assist control, when activated, causes the camera 110 to obtain an image at the area 150 at which it is pointed, for the purpose of reading information printed thereon.

In a first embodiment, the camera 150 images this area, and uses image processing to improve the readability of characters within the image. This image processing may increase the dynamic range of the image in a special way that assists with reading. One embodiment may treat the image as though it had two colors: dark from ink and light where there is no ink. The colors within the image, e.g., the blacks and blues within the image are detected, and treated as inked portions. The blacks and the blues are darkened, to make them more visible. In an embodiment, all color inks, e.g., blue and black, are treated precisely the same way after image processing. At the same time, the whites in the image, or areas that do not have blacks and blues, are brightened. Other colors (that is, any color other than white or tan), can be detected in a similar way, and made more prominent. The image can also be magnified. The colored portions within the image are then displayed on the display screen 120 of the communicator 100.

Figure 2:
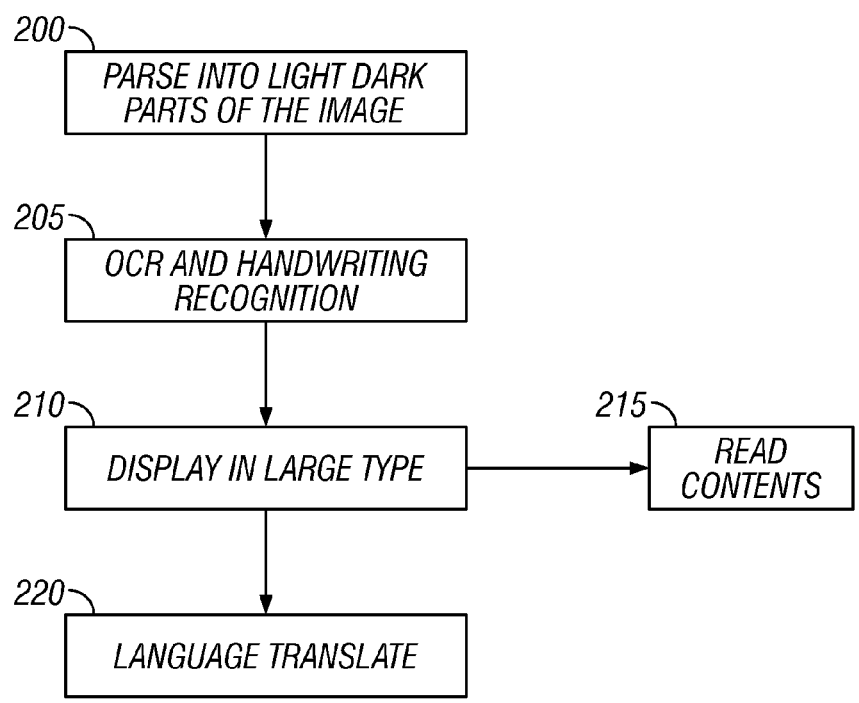
FIG. 2 illustrates a flowchart of operations.

In another embodiment, the image processed image is converted by processing elements within the communicator 100. FIG. 2 illustrates a process that is carried out by the processor within the phone 100. At 200, areas of the image obtained by the camera 150 are parsed into light (unprinted or unwritten) or dark (areas having printing or writing thereon) areas. This may be done by scanning the image, and finding areas which are brightest, and least bright. The top 30% brightest are analyzed, and a median or average color, reflectivity or other characteristic of those brightest portions are found. Similarly, the 30% least bright portions can be analyzed to find the median of dark areas. As an alternative, reflectivity can be analyzed.

These medians can be used as values to re-analzye the image. For example, the area 150 may be divided into pixels, or macro pixels, where each macro pixel may be 4 or 16 or some other number of native pixels of the camera. Assuming a 400×400 pixel area, those pixels are analyzed to determine if they are brighter than 80% of the median brightest, or less bright than 80% of the median less bright. This analysis is used to form a table that indicates the different states (dark or light) of the different pixels.

This assumes a two-color image, appropriate for reading many items like menus and bills. In this embodiment, the image is processed to characterize each portion of the image to be either a light portion of the image from ink, e.g., blue or black, or a dark portion of the image. Of course, more sophisticated techniques can be used to determine information in analogous way from multiple color images.

The pixels are then used to form images. Dark areas are clustered together, may be used to form individual characters.

At 205, the different characters are either optically character recognized using a conventional OCR system, or handwriting recognized using a handwriting recognition system. As part of the OCR at 205, the dark portions in the image that are closer together than a specified amount, e.g., closer together than 5 mm or 1 mm, (usually dots between dot matrix printers 0.35 mm or 0.21 mm) are merged. This may aid in recognizing characters that are printed by dot type printing elements.

The results are then displayed on the display, in a font that is appropriate for reading on the communicator's display.

In a second embodiment, the results may be read to the user. In this way, even severely sight impaired people can in essence, 'read' conventional menus.

An advantage of this system is that since cell phones have become ubiquitous, the use of a cell phone to read a menu or to read a bill in a dimly lit area is quite unexpected use of this technology.

Other embodiments may add additional functionality to this system of either the first or second embodiments discussed above. At 220, information is language-translated before being displayed. For example, a dictionary program may translate the text. The dictionary program can be local to the communicator, or the information can be digitized, sent to a remote server over the channel that usually carries the communication, and the results returned. This embodiment can allow translation of a Japanese menu or bill into English, for example. Any kind of automated translation system, e.g., machine translation, can be used for this purpose. The translation can use a local translation dictionary, for example, stored in the phone, and using the processor of the phone to make the translation. Alternatively, this may send the image or information to the remote server, which can translate the information and send back the translated information to be displayed.

Another embodiment may be used by color blind individuals to determine colors. A "read color" control can be initiated while the camera is pointed at an object. The control compares color characteristics of the image, and finds the predominant color within the image. It then displays or reads out the color, e.g., "red". The color blind person can point at items in their closet or at a store to find the colors in this way.

Figure 3:
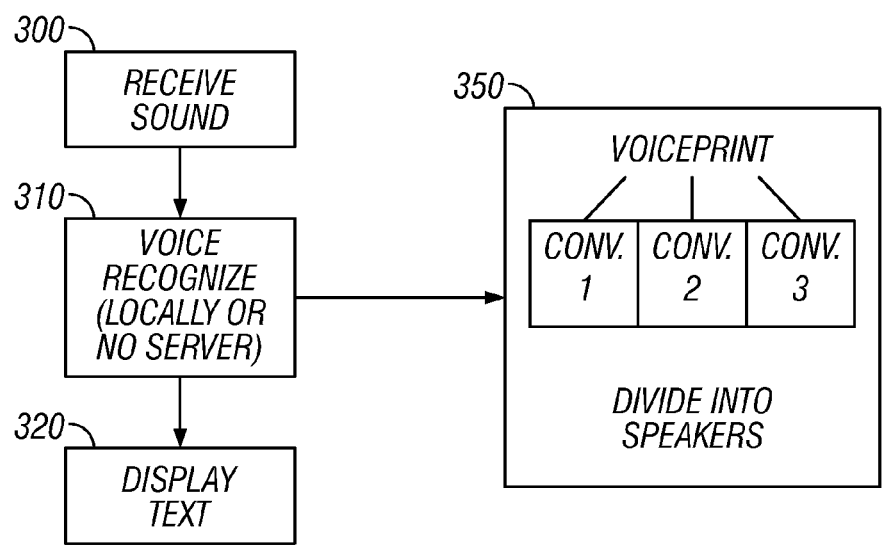
FIG. 3 shows a voice recognition embodiment.

Yet another embodiment uses the microphone 140 which is used for telephone calls. This microphone may be biased for receiving sound from far away, e.g., a speaker phone type microphone. The processor in the cell phone executes the flowchart shown in FIG. 3. At 300, it receives a sound. 310 illustrates a voice recognition system, which is carried out either locally on the phone, or by sending the information to a remote server. At 320, the text which has been voice recognized is displayed on the screen of the telephone.

An alternate embodiment adds a voice print operation to the voice recognition. The different voices which are received are characterized according to conventional voice characteristics such as voice pitch, voice quality, volume, and/or sex. In general, different characteristics of a person's voice are unique, and can be used to form a voice print to determine whether a person is the same as some other person. Using any of these voice printing techniques, the different received voices can be quantized into being different speakers. Different speakers may be saying different things. The voice print at 350 may select two or three of these to voice recognize. The different recognized voices are used to divide into words spoken by different speakers. The different voices are individually shown as separate "conversations", e.g., conv 1, conv 2 and conv 3, on the display of the communicator. For example 350 illustrates three different speakers, but 2, 4 or 5 could be displayed. 350 shows all being displayed at once; however, only the loudest could be displayed, with a control allowing change of display to another speaker.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while this describes a communicator, this may be done on a standalone and separate unit.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer described herein may be a desktop or handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A communication device, comprising:
a communicator that allows communicating over a channel and also includes a camera therein and has a display which displays communication information and also displays information from said camera; and
a processor, operable as part of said communicator, said processor obtaining an image from said camera, and image processing the image in a way that converts the image to a different form in a way that increases a readability of readable characters within the image to create a converted image, and creating a display output on said display that displays said characters in said converted image in a way that has enhanced readability, wherein said processor operates to translate a language of words within the image by obtaining digital information from the readable characters, sending said digital information over the channel using the communicator, and receiving translation information over the channel responsive to the sending of the digital information over the channel, the received translation information being indicative of a translated version of the words within the image, and wherein said output is indicative of a translated version of said words within the image, wherein said processor carries out said image processing to image process the image to characterize each portion of the image as being either a light portion or a dark portion by characterizing the image to find a median among most bright parts of the image and among least bright parts of the image, and characterizing the parts of the image by comparing them to the median, and displaying converted characters forming the image as including only light portions and dark portions.

2. A device as in claim 1, wherein said processor also operates to optically character recognize characters within the image, and wherein said processor creates said output by forming a display with converted characters based on said recognized characters, and uses characters that are displayed in fonts used for display by said communication device, where said fonts are different than a font in the characters that are optically character recognized.

3. A device as in claim 1, wherein said processor carries out image processing to find brightest portions and least bright portions within the image by comparing to 80% of the median.

4. A device as in claim 1, wherein said processor produces sounds indicative of said characters as said output.

5. A device as in claim 1, wherein said camera has a setting for receiving information that receives a usable image at an illumination of 1 lux or less.

6. A device as in claim 1, wherein said processor image processing the image characterizes black portions of the image in the same way that it characterizes blue portions of the image, and wherein said black and blue portions of the image are brightened relative to other portions of the image.

7. A method comprising:
using a portable communication device to communicate over a data channel at a first time and to display information on a display of the portable communication device;
using a camera in said portable communication device to obtain an image of a paper having words printed thereon at a second time;
image processing said image in a way that converts the image in a way that improves a readability of characters within the image to form a converted image, wherein said image processing characterizes each portion of the image as being either a light portion or a dark portion by characterizing the image to find a value among most bright parts of the image and among least bright parts of the image, and characterizes the parts of the image by comparing them to the value, and displays converted characters forming the image as including only light portions and dark portions; and
using said portable communication device for producing an output indicative of said characters within said image and to display said converted characters forming said words within the image on said display of the portable communication device, and wherein said image processing enhances the readability of said characters on the display; and
translating a language of words within the image by obtaining digital information from the readable characters, sending said digital information over the channel using the portable communication device, and receiving translation information over the channel responsive to the sending of the digital information over the channel, the received translation information being indicative of a translated version of the words within the image, and wherein said output is indicative of a translated version of said words within the image.

8. A method as in claim 7, where said producing an output comprises producing sounds indicative of words formed by characters within the image.

9. A method as in claim 7, wherein said camera obtains an image at a lighting amount less than 1 lux.

10. A method as in claim 7, wherein said image processing comprises image processing the image to characterize black portions of the image in the same way that it characterizes blue portions of the image, and wherein said black and blue portions of the image are brightened relative to other portions of the image.

11. A method as in claim 7, further comprising optically character recognizing characters within the image, and wherein said creating an output comprises forming a display based on said recognized characters, using characters that are displayed in fonts used for display by said communication device where said fonts are different than a font in the characters that are optically character recognized.

12. A method as in claim 7, further comprising finding brightest and least bright parts in the image, and finding said value includes a first median among most bright parts in the image and a second median among least bright parts in the image, and characterizing parts in the image by comparing them to first and second medians.

13. A method as in claim 12, wherein said comparing comprises comparing to 80% of the median.

14. A cellular telephone device comprising:
a cellular telephone part that allows communicating over a channel by speaking into a microphone and sending information from the microphone over the channel, said cellular telephone including a camera therein, said cellular telephone having a display which displays communication information and also displays information from said camera; and
said cellular telephone part having a processor therein,
wherein said processor operates to image process the image in a way that converts the image in a way that increases a readability of characters within the image, by sending information indicative of said image as obtained by the camera over the channel and receive data from a remote source indicative of the information that was sent over the channel, where the information received from the remote source is different than the data that was sent, and to create an output indicative thereof based on said information received, where the information received from the remote source is image processed information where each portion of the image has been characterized as being either a light portion or a dark portion by characterizing the image to find a value among most bright parts of the image and among least bright parts of the image, and characterizing the parts of the image by comparing them to the value, and displaying converted characters forming the image as including only portions and dark portions.

15. A device as in claim 14, wherein said cellular telephone parts operates to optically character recognize characters within the image, and creates a display based on said recognized characters, using characters that are displayed in fonts used for display by said communication device, where said fonts are different than a font in the characters that are optically character recognized.

16. A device as in claim 14, wherein said information received is translated versions of a language of words within the image, and produces an output indicative of a translated version of said words within the image.

17. A device as in claim 14, wherein said camera is capable of producing an image at an illumination of 0.1 lux or less.

18. A device as in claim 14, wherein said processor image processing the image to characterize black portions of the image in the same way that it characterizes blue portions of the image, and wherein said black and blue portions of the image are brightened relative to other portions of the image.

* * * * *